(12) United States Patent
Kobayashi (10) Patent No.: US 7,942,779 B2
(45) Date of Patent: May 17, 2011

(54) TURNING PORTION STRUCTURE OF INDUSTRIAL ROBOT

(75) Inventor: Harumi Kobayashi, Aichi (JP)

(73) Assignee: Nabtesco Corporation, Tokyo (JP)

( * ) Notice: Subject to any disclaimer, the term of this patent is extended or adjusted under 35 U.S.C. 154(b) by 694 days.

(21) Appl. No.: 11/911,740

(22) PCT Filed: Apr. 25, 2006

(86) PCT No.: PCT/JP2006/308645
§ 371 (c)(1),
(2), (4) Date: Oct. 17, 2007

(87) PCT Pub. No.: WO2006/115257
PCT Pub. Date: Nov. 2, 2006

(65) Prior Publication Data
US 2009/0019961 A1    Jan. 22, 2009

(30) Foreign Application Priority Data

Apr. 25, 2005    (JP) .................. 2005-126070

(51) Int. Cl.
*F16H 1/32*    (2006.01)
(52) U.S. Cl. .................. 475/177; 475/149; 475/170
(58) Field of Classification Search .................. 475/162, 475/176, 177, 170, 169
See application file for complete search history.

(56) References Cited

U.S. PATENT DOCUMENTS

| | | | |
|---|---|---|---|
| 3,241,384 A * | 3/1966 | Grimm ........................... | 74/353 |
| 6,508,737 B2 * | 1/2003 | Fujimoto ....................... | 475/178 |
| 6,699,152 B2 * | 3/2004 | Tanaka .......................... | 475/149 |
| 7,534,184 B2 | 5/2009 | Tsurumi | |
| 2001/0012809 A1 | 8/2001 | Fujimoto | |
| 2002/0066331 A1 | 6/2002 | Okada et al. | |

FOREIGN PATENT DOCUMENTS

| | | |
|---|---|---|
| JP | 3075345 | 7/1991 |
| JP | 07-124883 A | 5/1995 |
| JP | 09-057678 A | 3/1997 |
| JP | 2001-353684 A | 12/2001 |
| JP | 2002106650 | 4/2002 |

OTHER PUBLICATIONS

European Search Report, Apr. 9, 2008.

* cited by examiner

*Primary Examiner* — Roger L Pang
*Assistant Examiner* — Erin D Bishop
(74) *Attorney, Agent, or Firm* — Panitch Schwarze Belisario & Nadel LLP (57) ABSTRACT

To facilitate an integrating operation and to make fabricating cost inexpensive. An idle gear for transmitting rotation of an input gear of a drive motor to a cylindrical gear is rotatably supported by an input side end portion of a specific one crank pin, and therefore, the idle gear may simply be supported by the crank pin, further, a length in an axial direction of the cylindrical gear brought in mesh with both of the idle gear the input gear is sufficiently to a degree of being more or less longer than a distance between remote side ends of the two gears.

6 Claims, 5 Drawing Sheets

TURNING PORTION STRUCTURE OF INDUSTRIAL ROBOT

CROSS-REFERENCE TO RELATED APPLICATIONS

This application is a Section 371 of International Application No. PCT/JP2006/308645, filed Apr. 25, 2006, which was published in the Japanese language on Nov. 2, 2006, under International Publication No. WO 2006/115257 A1, the disclosure of which is incorporated herein by reference.

BACKGROUND OF THE INVENTION

The present invention relates to a structure of a turning portion of an industrial robot using an eccentrically oscillating speed reducer.

There is known a structure of a turning portion of an industrial robot of a background art described in, for example, JP-A-7-124883 shown below.

According to the structure, the structure includes a first member constituting a base of the industrial robot and a second member constituting a turning portion, and an eccentrically oscillating speed reducer arranged between the first member and the second member having 2 pieces or more of crank pins and transmitting rotation provided to the crank pin to the second member by reducing a speed thereof and rotating the second member by a speed lower than that of the first member, an input gear respectively fixed to input side end portions of all of the crank pins, a rotating cylindrical member coaxial with a center axis of the eccentrically oscillating speed reducer, penetrating inside of the eccentrically oscillating speed reducer, provided with a first outer gear brought in mesh with all of the input gears at one end thereof and provided with a second outer gear at other end thereof, and an idle gear rotatably supported by the second member by way of a pair of bearings and brought in mesh with the second outer gear, and a drive motor provided with an output gear brought in mesh with an idle gear at an output shaft thereof and arranged remotely from the center axis of the eccentrically oscillating speed reducer by a predetermined distance in a radius direction.

Further, according thereto, rotation from the drive motor is transmitted to the single rotating cylindrical member by way of the output gear, the idle gear, the second outer gear, thereafter, a rotational torque is transmitted to all of the crank pins by way of the first outer gear of the rotating cylindrical member, the input gear while distributing the rotational torque substantially equally thereto.

However, according to the structure of the turning portion of an industrial robot of the background art, in order to rotatably supporting the idle gear by the second member, it is necessary to support the idle gear by the pair of bearings and integrating the pair of bearings to the second member, further, in order to avoid an interference of the input gear and the idle gear, it is necessary to penetrate the rotating cylindrical member provided with the first outer gear brought in mesh with the input gear at one end thereof and the second outer gear brought in mesh with the idle gear at other end thereof at inside of the eccentrically oscillating speed reducer, as a result, there poses a problem that an integrating operation becomes troublesome, the rotating cylindrical member is large-sized (an axial direction length thereof is prolonged) to make fabricating cost expensive.

BRIEF SUMMARY OF THE INVENTION

It is an object of the invention to provide a structure of a turning portion of an industrial robot facilitating an integrating operation and capable of being fabricated inexpensively.

Such an object can be achieved by a structure of a turning portion of an industrial robot including a first member and a second member of an industrial robot, and an eccentrically oscillating speed reducer arranged between the first member and the second member, having two pieces or more of crank pins, and reducing a speed of rotation provided to the crank pin to be transmitted to the second member to thereby rotate the second member by a speed lower than a speed of the first member, input gears respectively attached to input side end portions of all of the crank pins, a cylindrical gear coaxial with a center axis of the eccentrically oscillating speed reducer and brought in mesh with all of the input gears, an idle gear rotatably supported by the input side end portion of a specific one crank pin in the crank pins to be remote from the input gear in an axial direction and brought in mesh with the cylindrical gear, and an output gear brought in mesh with the idle gear at an output shaft, and including a drive motor arranged to be remote from the center axis of the eccentrically oscillating speed reducer by a predetermined distance in a radius direction.

According to the invention, the idle gear for transmitting the rotation of the output shaft (output gear) of the drive motor to the cylindrical gear is rotatably supported by the input side end portion of the specific one crank pin in the crank pins, and therefore, the idle gear may simply be supported by the specific crank pin, further, the input side end portion of the specific one crank pin is arranged with the idle gear and the input gear to be remote from each other in the axial direction, and therefore, a length in an axial direction of the cylindrical gear brought in mesh with both of the idle gear, the input gear is sufficiently to a degree of being more or less longer than a distance between remote side ends of the two gears, as a result, an integrating operation is facilitated and fabricating cost can be made to be inexpensive.

Further, when there is constructed a constitution in which the idle gear is provided with two gear portions of a small diameter gear portion and a large diameter gear portion an addendum circle of which passes a vicinity of an inner peripheral face of the cylindrical gear remote from each other in the axial direction, the output gear of the drive motor is brought in mesh with the large diameter gear portion and the cylindrical gear is brought in mesh with the small diameter gear portion, respectively, a speed reduction ratio between the output gear and the cylindrical gear can be increased while maintaining an inner diameter of the cylindrical gear by a current value.

Further, when there is constructed a constitution in which the cylindrical gear is provided with two gear portions of a small diameter gear portion and a large diameter gear portion remote from each other in an axial direction, all of the input gears are brought in mesh with the small diameter gear portion and the idle gear is brought in mesh with the large diameter gear portion, respectively, the speed reduction ration between the output gear and the cylindrical gear can be increased in comparison with a case in which the cylindrical gear is constituted by a constant diameter at any position in the axial direction.

Further, when there is constructed a constitution in which the drive motor is attached to the second member, and the input side end of the specific one crank pin is rotatably supported by the second member, mesh of the output gear and the idle gear can be brought into a rectified state without striking a positioning pin between the eccentrically oscillating speed reducer and the second member.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Embodiment 1

Embodiment 1 of the invention will be explained in reference to the drawings as follows.

In FIGS. 1, 2, 3 and 4, numeral 11 designates a main body portion (base) of an industrial robot 10 constituting a first member, the main body portion 11 shows a shape of a cylinder a center axis of which is extended vertically, and formed with a space 12 containing wirings, pipings at inside thereof. An upper side of the main body portion 11 is installed with a turning member 13 constituting a second member rotated around an axis line coaxial with the center axis of the main body portion 11, inside of the turning member 13 is formed with a space 14 extended in an up and down direction, and one end portion (lower end portion) thereof is formed with a through hole 15 disposed on a rotational axis.

Numeral 17 designates an eccentrically oscillating speed reducer arranged between the main body portion 11 and the turning member 13, the speed reducing machine 17 is fixed to an upper end of the main body portion 11 by a plurality of bolts 18 and includes a case 19 substantially in a cylindrical shape coaxial with the main body portion 11. A number of pin teeth 20 constituting inner teeth constituted by a shape of a circular pillar are provided on an inner periphery of the case 11 and at a center portion in an axial direction thereof in a state of being embedded substantially by halves thereof, the pin teeth 20 are extended in the axial direction and arranged in a peripheral direction remote from each other by equal distances.

Numeral 21 designates a plurality (2 pieces) of pinions showing a shape of a circular disk and contained by being aligned in the axial direction, and center portions of the pinions 21 are respectively formed with center holes 22. Further, an outer periphery of the pinion 21 is formed with outer teeth 23 comprising a number of trochoidal tooth shape, a number of teeth of the outer teeth 23 is more or less smaller than that of the pin teeth 20 of the case 19, in this case, by 1 piece. Further, the outer teeth 23 and the pin teeth 20 are brought in mesh with each other in a state of inwardly bringing the pinion 21 and the case 19 into contact with each other, and phases thereof are shifted from each other by 180 degrees at a maximum mesh portion (portion having the deepest mesh) of the two pinions 21. Further, middle portions between inner and outer peripheries of the pinions 21 are formed with a plurality (3 pieces) of through holes 25 penetrated in the axial direction by being remote from each other in the peripheral direction by equal distances.

Numeral 26 designates a carrier inserted into the case 19 and the carrier 26 is constituted by one side end face portion 27 arranged on one side (lower side) in the axial direction of the pinion 21, other side end plate portion 28 arranged on other side (upper side) in the axial direction of the pinion 21 and connected to the turning member 13 by a plurality of bolts 30, and a plurality of pieces (a number thereof is equal to that of the through holes 25) of pillar portions 29 lower ends of which are attachably and detachably connected to the one side end plate portion 27 by a plurality of bolts 31 and which are extended in the axial direction, the pillar portions 29 are respectively fitted loosely to insides of the through holes 25. Further, center holes 32, 33 having a diameter substantially the same as that of the center hole 22 are respectively formed on a center axis on a carrier 26, in details, on one side and the other side end plate portions 27, 28.

Numeral 36 designates a pair of bearings interposed between an outer periphery of the carrier 26, in details, the one side and other side end plate portions 27, 28, and inner peripheries of both end portions in the axial direction of the case 19, and the carrier 26 is supported by the bearing 36 relatively rotatably to the case 19. Further, seal members 37 are interposed between the one side and other side end plate portions 27, 28 and the both end portions in the axial direction of the case 19.

Numeral 39 designates a plurality (3 pieces) of crank pin holes extended in the axial direction formed at the respective pinions 21, and the crank pins hole 39 are arranged remotely from each other in the peripheral direction by equal distances and alternately with the through holes 25. Numeral 40 designates 2 pieces or more (by a number the same as that of the crank pin holes 39) of crank pins extended in the axial direction arranged remotely from each other in the peripheral direction by equal distances, a pair of bearings 41 remote from each other in the axial direction are interposed between the respective crank pins 40 and the carrier 26, in details, the one side and other side end plate portions 27, 28, thereby, the crank pin 40 is rotatably supported by the carrier 26 by way of the pair of bearings 41.

Further, the respective crank pins 40 include eccentric portions 43 of a number the same as that of the pinions 21 (2 pieces) made to be eccentric from center axes of the crank pins 40 by equal distances at the middle portions in the axial direction, and the eccentric portions 43 are remote from each other by a small distance in the axial direction and phases thereof are shifted from each other by 180 degrees. Further, the eccentric portions 43 of the crank pins 40 are inserted into the crank pin holes 39 of the pinion 21 respectively by way of needle-like roller bearings 44, as a result, the pinion 21 and the crank pin 40 are permitted to rotate relative to each other.

Numeral 46 designates a cylindrical member inserted into the carrier 26 and coaxial with the case 19, and one end portion (lower end portion) in the axial direction of the cylindrical member 46 is inserted into the center hole 32 of the one side end plate portion 27 in a hermetically sealed state and is fixed to the one side end plate portion 27 by a plurality of bolts 47. Further, the cylindrical member 46 is loosely fitted into the through hole 22, the center hole 33 at a center portion in an axial direction thereof, and other end portion (upper end portion) in the axial direction is loosely fitted into the through hole 15 of the turning member 13. Further, a seal member 48 is interposed between the other end in the axial direction of the cylindrical member 46 and the through hole 15 of the turning member 13.

Thereby, the space 12 at inside of the main body portion 11 and the space 14 at inside of the turning member 13 are communicated by passing a center hole 49 at inside of the cylindrical member 46 provided on a center axis of the speed reducing machine 17, and the center hole 49 is used for passing wirings, pipings or the like, in this case, cables 50. The case 19, the pinion 21, the carrier 26, the crank pin 40, the cylindrical member 46 constitute the speed reducing machine 17 as a whole for transmitting rotation provided to the crank pin 40 to the carrier 26 or the case 19, in this case, from the carrier 26 to the turning member 13 by reducing a speed thereof and rotating the turning member 13 relative to the main body portion 11 at a low speed, a lubricant or the like at inside of the speed reducing machine 17 is shut off from the hollow hole 49, the spaces 12, 14 by the cylindrical member 46.

Numeral 53 designates a motor supporting portion provided at one end portion (lower end portion) of the turning member 13, and a drive motor 54 is positioned at the motor supporting portion 53 by faucet fitting and is fixed thereto by a bolt (not illustrated). Here, the drive motor 54 (output shaft 55) is arranged to be remote from the center axis of the speed reducing machine 17 by a predetermined distance in a radius direction from a reason of avoiding interference with the cables 50 or the like, and the predetermined distance is larger than the distance from the center of the hollow hole 49 to a rotating shaft of the crank pin 40. As a result, the crank pin 40 is disposed between the output shaft 55 of the drive motor 54 and the cylindrical member 46. Further, the output shaft 55 of the drive motor 54 is fixed with an input gear 56 constituting an output gear by a key 57.

Numeral 60 designates a plurality (constituting a number the same as that of the crank pins 40) of input gears comprising outer gears attached to input side end portions of all of the crank pins 40, in this case, other end portions (upper end portions) in the axial direction projected from the carrier 26 by spline coupling, and the input gears 60 are provided with the same diameter and respectively arranged at apexes of a regular triangle. Numeral 61 designates 1 piece of cylindrical gear fitted to an outer side of other side of the cylindrical member 46 by providing a small clearance therebetween, the cylindrical gear 61 is coaxial with the center axis of the speed reducing machine 17 and a pitch circle thereof is the same diameter at any axial direction position.

Further, one end portion (lower end portion) in the axial direction of the cylindrical gear 61 is rotatably supported by the other side end plate portion 28 of the speed reducing machine 17 by way of a bearing 62, on the other hand, other end portion (upper end portion) thereof in the axial direction is rotatably supported by the one end portion of the turning member 13 by way of a bearing 63. Further, outer teeth 64 formed on an outer side of the center portion in the axial direction of the cylindrical gear 61 are brought in mesh with all of the input gears 60, as a result, a rotation drive force is directly and equally distributed from the cylindrical gear 61 to the input gears 60.

Here, in the crank pins 40, according to the crank pin 40 arranged at a position remote from the drive motor 54, other side end thereof is finished at a position remote from the input gear 60 to more or less other side, however, a specific one crank pin 40a arranged at a position proximate to the drive motor 54 is provided with an extended portion 40b extended from other side end further to an other side at an input side end portion thereof. Further, the extended portion 40b of the crank pin 40a is rotatably supported by a receive 67 formed at the motor supporting portion 53 by way of a bearing 68.

When the drive motor 54 is attached to the motor supporting portion 53 constituting a portion of the turning member 13 in this way and the input side end of the specific one crank pin 40a is rotatably supported by the receive 67 constituting a portion of the turning member 13, one end portion of the extended portion 40b of the crank pin 40a can be supported, a distance between axes of the input gear 56 and an idle gear 70 mentioned later can be constituted by a set value to bring mesh thereof easily brought into a rectified state without striking a positioning pin between the speed reducing machine 17 (carrier 26) and the turning member 13 when the drive motor 54 is attached.

Further, one piece of the idle gear 70 having a tooth shape and a number of teeth the same as those of the input gear 60 is rotatably supported by the extended portion 40b of the crank pin 40a, as a result, the idle gear 70 is rotatably supported by the input side end portion of the crank pin 40a to be more or less remote from the input gear 60 in an axial direction, in this case, on other side in the axial direction. When the input gear 60 and the idle gear 70 are constituted by the same tooth shape and the same number of teeth in this way, a working tool for forming the tooth shape can be made to be common, and fabrication cost can be made to be inexpensive.

Further, the idle gear 70 for transmitting rotation of the output shaft 55 (input gear 56) of the drive motor 54 to the cylindrical gear 61 is rotatably supported by the input side end portion of the specific one crank pin 40a in the crank pins 40 as described above, and therefore, the idle gear 70 may simply be supported by the specific one crank pin 40a without being mounted to a bearing or without integrating the bearing to the second member as in the background art, further, the input side end portion of the specific one crank pin 40a is arranged with the idle gear 70 and the input gear 60 to be remote from each other in the axial direction, and therefore, a length in an axial direction of the cylindrical gear 61 brought in mesh with both of the idle gear 70 and the input gear 60 is sufficiently to a degree of being more or less longer than a distance between remote side ends of the two gears 70, 60 and the cylindrical gear 61 can be downsized, as a result, the integrating operation is facilitated and fabrication cost can be made to be inexpensive.

Further, the idle gear 70 is brought in mesh with both of the input gear 56 and the outer teeth 64 of the cylindrical gear 61, as a result, the rotational torque from the drive motor 54 is transmitted to the cylindrical gear 61 by way of the input gear 56 and the idle gear 70, thereafter, transmitted from the cylindrical gear 61 to all of the input gears 60 while being distributed equally and all of the crank pins 40 can be rotated in the same direction and by the same rotational speed.

Further, when the drive motor 54 is arranged to be remote from the center of the hollow hole 49 by the predetermined distance in the radius direction as described above, and the input gear 56 is brought in mesh with only the idle gear 70 rotatably supported by the specific one crank pin 40a, the drive motor 54 can be arranged in a wide range at a surrounding of the idle gear 70. The input gear 56, the input gear 60, the cylindrical gear 61, and the idle gear 70 mentioned above constitute a front stage speed reducing machine 72 for reducing a speed of rotation of the drive motor 54 to be outputted to all of the crank pins 40 of the speed reducing machine 17 as a whole.

Next, operation of the embodiment of the invention will be explained.

When the turning member 13 is turned relative to the main body portion 11, the drive motor 54 is operated to integrally rotate the output shaft 55, the input gear 56. At this occasion, both of the input gear 56 and the outer teeth 64 of the cylindrical gear 61 are brought in mesh with the idle gear 70 rotatably supported by the specific one crank pin 40a, and therefore, the rotational torque of the drive motor 54 is transmitted to the cylindrical gear 61 by way of the input gear 56, the idle gear 70 and thereafter transmitted from the cylindrical gear 61 to all of the input gears 60 while being distributed equally to rotate all of the crank pins 40 in the same direction and by the same rotational speed.

Thereby, the pinion 21 is eccentrically rotated (revolved) by a rotational speed the same as that of the crank pin 40, at this occasion, a number of teeth of the outer teeth 23 of the pinion 21 brought in mesh with the pin teeth 20 is smaller than that of the pin teeth 20 by one piece, further, the case 19 is fixed to the main body portion 11 so as not to be able to be rotated, and therefore, a rotational drive force exerted to the crank pin 40 is reduced by the case 19, the pinion 21 by a high ratio and is transmitted from the carrier 26 to the turning member 13. Thereby, the turning member 13 is rotated around a vertical axis line by a low speed and a large torque.

Embodiment 2

Figure 1:
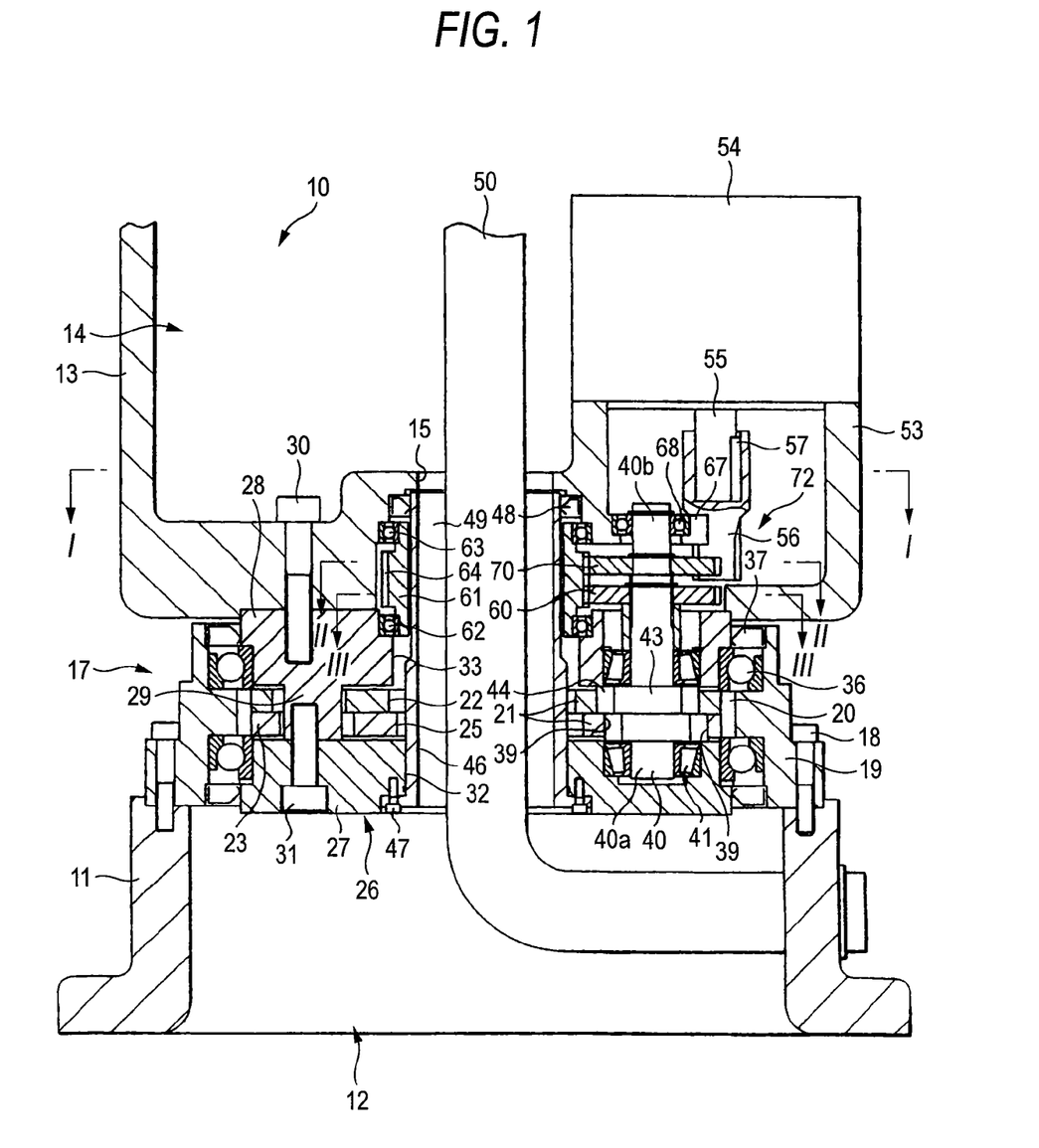
FIG. 1 is a front sectional view showing embodiment 1 of the invention.
Figure 2:
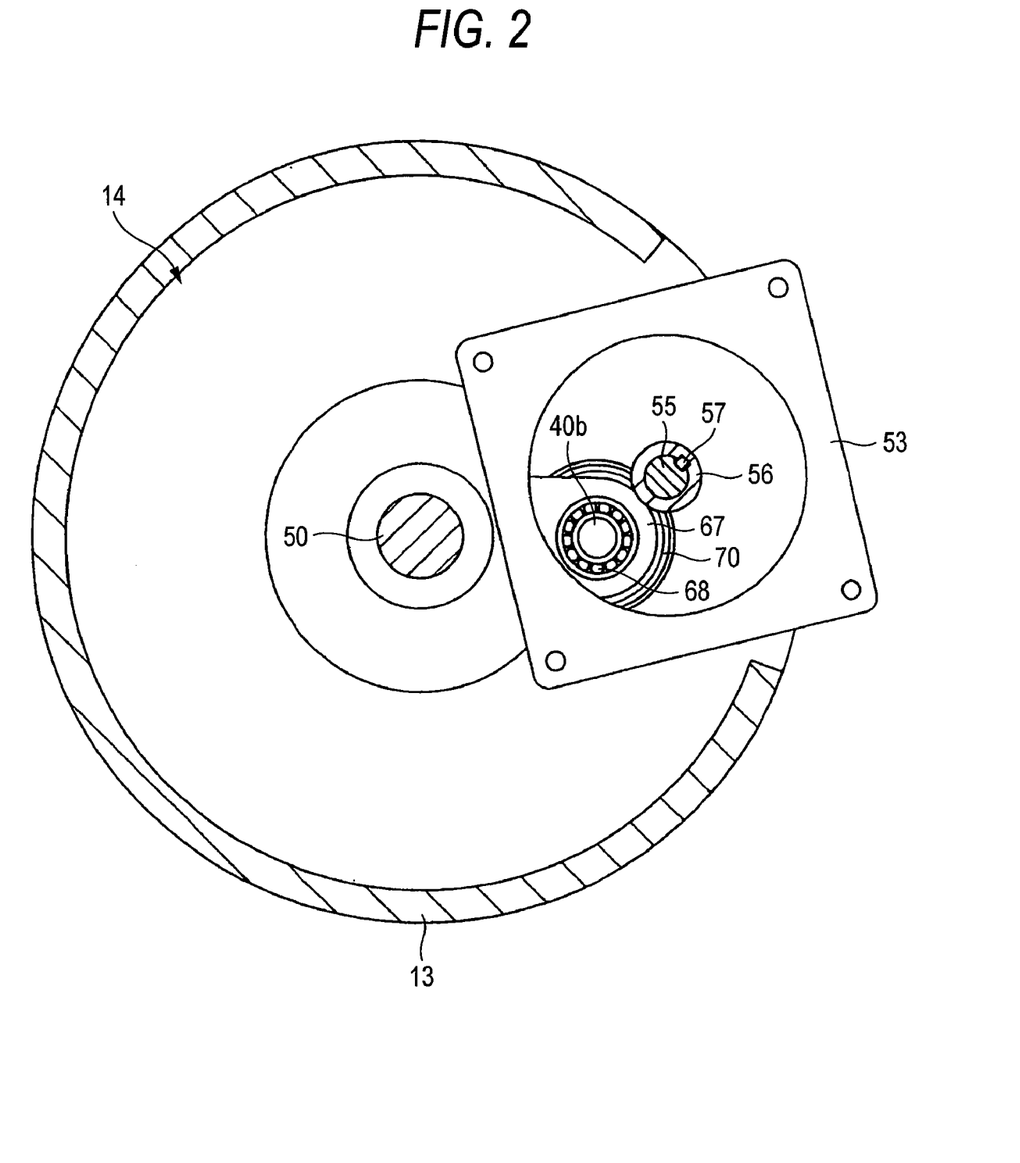
FIG. 2 is a sectional view taken along a line I-I of FIG. 1.
Figure 3:
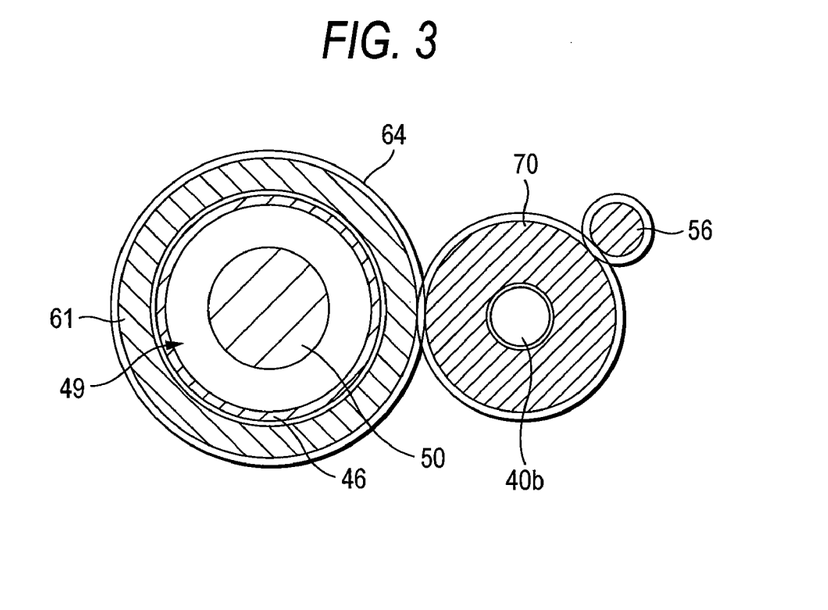
FIG. 3 is a sectional view taken along a line II-II of FIG. 1.
Figure 4:
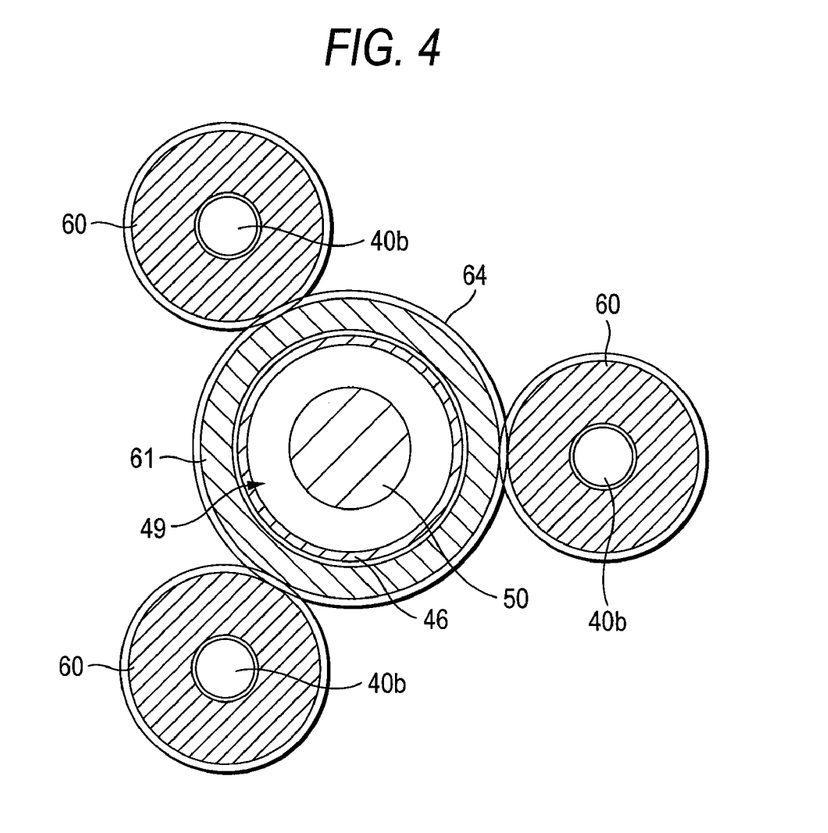
FIG. 4 is a sectional view taken long a line III-III of FIG. 1.
Figure 5:
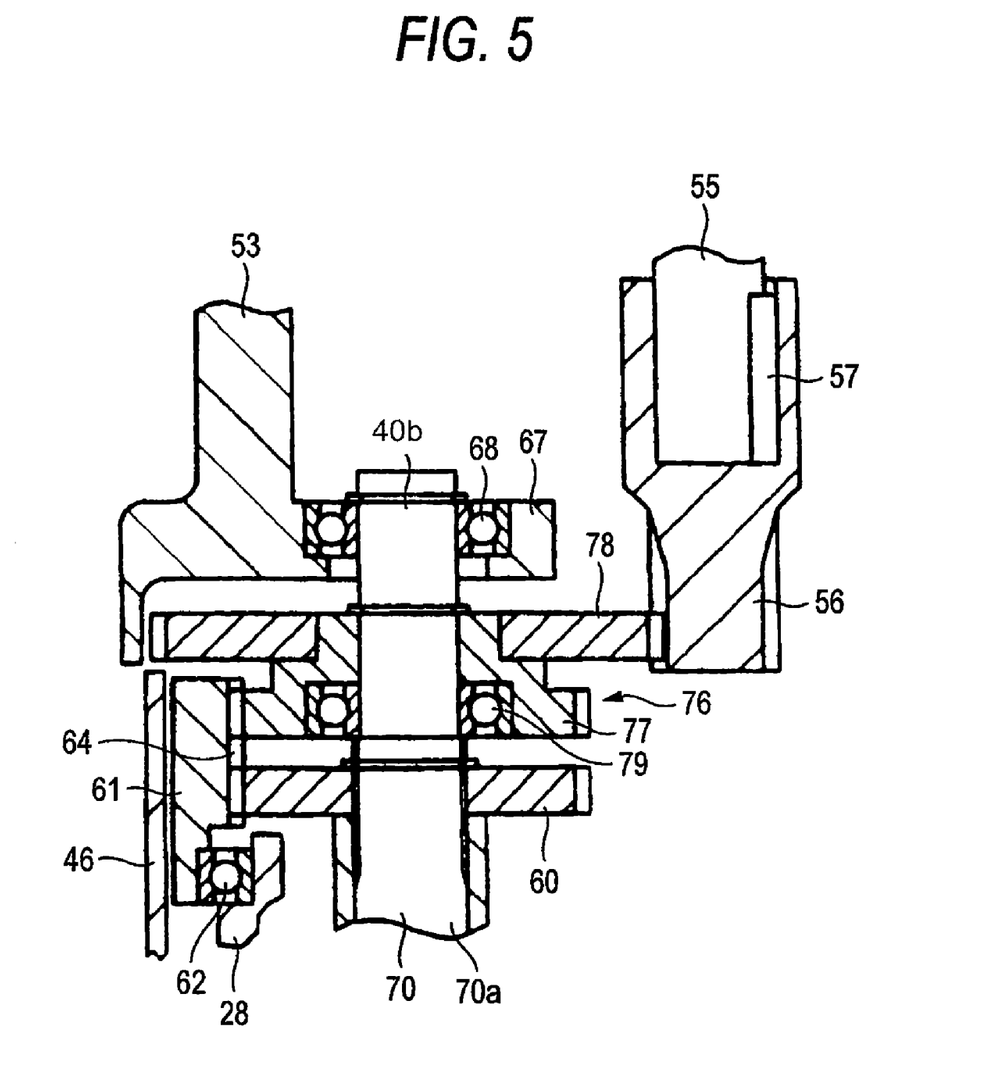
FIG. 5 is a front sectional view of a vicinity of an idle gear showing embodiment 2 of the invention.

FIG. 5 is a view showing embodiment 2 of the invention. According to the embodiment, an idle gear 76 is provided with a small diameter gear portion 77 and a large diameter gear portion 78 having a diameter larger than that of the small diameter gear portion 77 remote from each other in an axial direction, a diameter of the small diameter gear portion 77 is made to be the same as that of the input gear 76, on the other hand, an addendum circle of the large diameter gear portion 78 is constituted by a diameter of passing a vicinity of an inner peripheral face of the cylindrical gear 61. Further, according to the embodiment, the idle gear 76 is rotatably supported by the input side end portion of the crank pin 40 by way of a bearing 79. Further, although the bearing 79 between the idle gear 76 and the input side end portion of the crank pin 40 may be provided as in the embodiment, the bearing 79 may be dispensed with as in embodiment 1.

Further, the large diameter gear portion 78 is disposed on other side (upper side) of other end face (upper end face) of the cylindrical gear 61 and brought in mesh with the input gear of the drive motor 54 while avoiding an interference between the larger diameter gear portion 78 and the cylindrical gear 61, on the other hand, the small diameter gear portion 77 is brought in mesh with the outer teeth 64 of the cylindrical gear 61, respectively. Thereby, a speed reduction ratio of the front stage speed reducing machine 72, that is, between the input gear 56 and the cylindrical gear 61 can easily be increased while ensuring the large diameter hollow hole 49 for passing cables 50 on the center axis of the speed reducing machine 17 by maintaining the inner diameter of the cylindrical gear 61 by a current value. Further, other constitution and operation etc. are similar to those of the embodiment 1.

Embodiment 3

Figure 6:
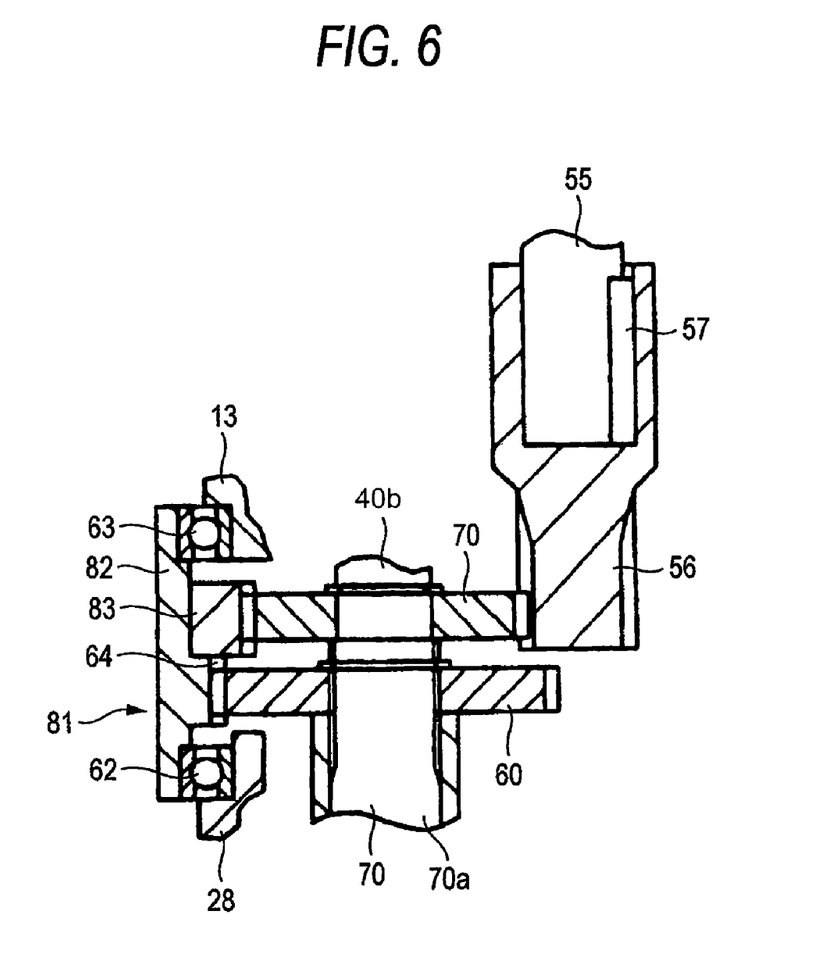
FIG. 6 is a front sectional view of a vicinity of an idle gear showing embodiment 3 of the invention.

FIG. 6 is a view showing embodiment 3 of the invention. According to the embodiment, a cylindrical gear 81 is provided with two gear portions of a small diameter gear portion 82, and a large diameter gear portion 83 having a diameter more or less larger than that of the small diameter gear portion 82 remote from each other in an axial direction, and all of the input gears 60 are brought in mesh with the small diameter gear portion 82, the idle gear 70 is brought in mesh with the large diameter gear portion 83, respectively. Thereby, the speed reduction ratio of the front stage speed reducing machine 72, that is, between the input gear 56 and the cylindrical gear 81 can easily be made to be more or less large. Further, other constitution, operation are similar to those of the embodiment 1.

Further, although in the above-described embodiment, the idle gear 70 is arranged on the input end side (outer end side in the axial direction) of the crank pin 40a more than the input gear 60, according to the invention, the input gear may conversely be arranged on the input end side of the crank pin more than the idle gear. Further, although according to the above-described embodiment, the drive motor 54 is provided at the second member (turning member 13) constituting a rotating side, according to the invention, the drive motor 54 may be provided at the first member (main body portion 11) constituting a fixed side.

The invention can be applied to the structure of the turning portion of the industrial robot using the eccentrically oscillating speed reducer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A structure of a turning portion of an industrial robot comprising:
   a first member and a second member of an industrial robot;
   an eccentrically oscillating speed reducer arranged between the first member and the second member, having two pieces or more of crank pins, and reducing a speed of rotation provided to the crank pin to be transmitted to the second member to thereby rotate the second member by a speed lower than a speed of the first member;
   input gears respectively attached to input side end portions of all of the crank pins;
   a cylindrical gear coaxial with a center axis of the eccentrically oscillating speed reducer and brought in mesh with all of the input gears;
   an idle gear rotatably supported by the input side end portion of a specific one crank pin in the crank pins to be remote from the input gear in an axial direction and brought in mesh with the cylindrical gear; and
   an output gear brought in mesh with the idle gear at an output shaft, and including a drive motor arranged to be remote from the center axis of the eccentrically oscillating speed reducer by a predetermined distance in a radius direction.

2. The structure of a turning portion of an industrial robot according to claim 1, wherein the idle gear is provided with two gear portions of a small diameter gear portion and a large diameter gear portion an addendum circle of which passes vicinity of an inner peripheral face of the cylindrical gear to be remote from each other in an axial direction,
   an output gear of the drive motor is brought in mesh with the large diameter gear portion and
   the cylindrical gear is brought in mesh with the small diameter gear portion, respectively.

3. The structure of a turning portion of an industrial robot according to claim 1, wherein the cylindrical gear is provided with two gear portions of a small diameter gear portion and a large diameter gear portion remote from each other in an axial direction, and
   all of the input gears are brought in mesh with the small diameter gear portion and the idle gear is brought in mesh with the large diameter gear portion, respectively.

4. The structure of a turning portion of an industrial robot according to claim 1, wherein the drive motor is attached to the second member, and the input side end of the specific one crank pin is rotatably supported by the second member.

5. An eccentrically oscillation speed reducer which outputs a rotation through a rotatable pinion while reducing a speed of the rotation, comprising:
- a large diameter gear portion receiving a driving force from an output shaft by meshing with an output gear provided on the output shaft of a drive motor;
- a small diameter gear portion disposed apart from the large diameter gear portion in an axial direction apart from the large diameter gear portion in an axial direction thereof and integrally rotated with the large diameter gear portion;
- a plurality of crank pins having eccentric portions to rotate the pinion;
- a plurality of input gears provided on each of the crank pins so that the crank pins receive the input rotational torque; and
- a cylindrical gear brought into mesh with the smaller diameter gear portion and the input gears such that a rotation of the smaller diameter gear portion are evenly transmitted to the input gears.

6. A structure of a turning portion of an industrial robot comprising:
- a first member an a second member of an industrial robot; and
- an eccentrically oscillation speed reducer according to claim 5, wherein the eccentrically oscillation speed reducer is arranged between the first member and the second member such that a case of the eccentrically oscillation speed reducer is fixed to the first member and a carrier of the eccentrically oscillation speed reducer is coupled to the second member,
- wherein the drive motor is arranged to be remote from a center axis of the eccentrically oscillation speed reducer by a predetermined distance in a radius direction thereof, and is attached to the second member.

* * * * *